(12) United States Patent
Beneker et al.

(10) Patent No.: US 7,679,496 B2
(45) Date of Patent: Mar. 16, 2010

(54) ADJUSTING MECHANISM OF A MOTOR VEHICLE, IN PARTICULAR FOR AUTOMOBILE SEATS, AND METHOD FOR OPERATING SUCH AN ADJUSTING MECHANISM AND ITS USE

(75) Inventors: Wilfried Beneker, Leichlingen (DE); Stefan Lingnau, Solingen (DE); Michael Relmann, Düsseldorf (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 282 days.

(21) Appl. No.: 11/901,216

(22) Filed: Sep. 14, 2007

(65) Prior Publication Data

US 2008/0094194 A1    Apr. 24, 2008

(30) Foreign Application Priority Data

Sep. 14, 2006  (DE) .................. 10 2006 044 031
Aug. 2, 2007   (DE) .................. 10 2007 036 538

(51) Int. Cl.
*B60Q 1/00*    (2006.01)

(52) U.S. Cl. .................. 340/435; 340/660; 701/36; 701/49

(58) Field of Classification Search ................ 340/435, 340/657, 660, 825.22, 825.37, 825.4; 307/9.1, 307/10.1; 701/36, 49, 41, 45; 297/216.1, 297/344.1; 318/114
See application file for complete search history.

(56) References Cited

U.S. PATENT DOCUMENTS

| | | | |
|---|---|---|---|
| 5,552,684 A | 9/1996 | Wada et al. | |
| 5,969,919 A | 10/1999 | Kobayashi et al. | |
| 6,243,635 B1 * | 6/2001 | Swan et al. | 701/49 |
| 6,590,354 B2 * | 7/2003 | Hein | 318/34 |
| 2007/0164619 A1 * | 7/2007 | Greene | 310/68 B |

FOREIGN PATENT DOCUMENTS

| | | |
|---|---|---|
| DE | 199 47 500 A1 | 5/2001 |
| DE | 10 2004 031 573 B3 | 8/2005 |

* cited by examiner

*Primary Examiner*—Toan N Pham
(74) *Attorney, Agent, or Firm*—McCarter & English, LLP

(57) ABSTRACT

An adjustment device and method for an automobile seat or steering column. The adjustment device has an adjustment mechanism including an electric actuator, such as an electric motor, with plug-in connections. A control unit with a signal generator applies an adjustment voltage to the connections during an adjustment process, and may also, either simultaneously with or without the adjustment voltage, apply an alternating signal voltage to produce at least one of a tangible motion or an audible motion.

13 Claims, 3 Drawing Sheets

ADJUSTING MECHANISM OF A MOTOR VEHICLE, IN PARTICULAR FOR AUTOMOBILE SEATS, AND METHOD FOR OPERATING SUCH AN ADJUSTING MECHANISM AND ITS USE

CROSS REFERENCE TO RELATED APPLICATIONS

This application claims priority to German Application No. DE 10 2006 044 031.5, filed Sep. 14, 2006, and German Application No. DE 10 2007 036 538.3, filed Aug. 2, 2007, the contents of which are all expressly incorporated by reference as part of the present disclosure.

BACKGROUND

The invention relates to an adjusting mechanism of a motor vehicle. The adjusting mechanism has at least one electrical actuator, which exhibits plug-in connections for a power supply. It also has a power source, a controller and a power output element. The controller controls the power output element, and the power output element is arranged between the power source and actuator. Examples of such adjusting mechanisms include motorized drive units for mechanically adjusting rear view mirrors, steering columns, window lifters, antenna motors, and in particular in vehicle seats. Adjusting mechanisms of the kind under consideration here are known, for example, from DE 199 47 500 A1, DE 10 2004 031 573 B3, U.S. Pat. No. 5,969,919 A and U.S. Pat. No. 5,552,684 A.

The power output element is usually equipped with controllable semiconductor valves, e.g., with a half-bridge or full bridge. A single power transistor is basically sufficient. Field effect transistors are normally used.

Proceeding from the previously known adjusting mechanism, the object of the invention is to expand the sphere of use and application for this previously known adjusting mechanism. Additional functions are to be imparted to it in the process.

SUMMARY

This object is achieved by the method for operating an adjusting mechanism for a motor vehicle, in particular an automobile seat and/or an adjustable steering column, wherein the adjusting mechanism exhibits an electric actuator, which is designed in particular as an electric motor, and wherein the electric actuator has plug-in connections, to which an electrical adjusting voltage is applied during an adjusting process, wherein a signal voltage that consists of alternating voltage and prompts a tangible and/or audible adjusting motion by the actuator is applied to the plug-in connections, either simultaneously or not simultaneously with the adjusting voltage, the use of an adjusting mechanism as a transducing sensor for generating an audible and/or tangible signal, in particular a) in a critical situation of the motor vehicle, wherein the following are examples of critical situations: driver falls asleep, crosses a line, tailgates another car, is too close to an obstacle, or b) during an adjusting process, for example a latching sound during an adjusting process, a signal at the end of the motion range, or an acoustic instruction or information during the adjusting process and/or c) for changing the sound normally made by the adjusting mechanism during an adjusting process, by adding sound components, in particular ones in desired frequency ranges and desired amplitudes, and the adjusting mechanism for a motor vehicle, in particular an automobile seat or adjustable steering column, with an electric actuator, which is designed in particular as an electric motor, wherein the electric actuator has lug-in-connections, with a control unit and power output element, wherein the power output element is arranged between the power source and plug-in connections of the actuator, is controlled by the control unit and applies an electrical adjusting voltage to the plug-in connections during an adjusting process, wherein the control unit additionally exhibits a signal generator, and that the power output element optionally exposes the plug-in connections to a signal voltage that takes the form of alternating voltage.

The adjusting drive retains the function and properties it has under prior art. Its actual job, or primary function, is the adjusting operation. The latter is retained. A second function, also referred to as secondary function, is added. No hierarchy is here established between secondary and primary. The secondary function involves that of a transducing sensor of the actuator, which can send out different signals. These can be tangible and/or audible, essentially depending on the frequency range.

The actuator is prompted to execute short movements for the secondary function, controlled by the signal voltage in the controller. They can be freely selected in terms of their amplitude, signal/interval ratio and frequency or frequencies. The frequency and amplitude should here be selected in such a way that the operator feels and/or hears the activation of the actuator by the signal voltage. The primary function can be performed simultaneously with the secondary function or not; both are basically independent of each other.

Therefore, the invention enables a further development and additional use of the adjusting mechanism. The signal can be used for various applications, e.g., as a warning signal, an acoustic improvement of the sound generated by the adjusting process, e.g., acoustic tuning, and as a tangible and/or audible information about the adjusting process, e.g., when the latter has reached its end point and/or a specific segment of the adjustment motion has been traversed.

The invention is relatively simple to implement in terms of the device. The actuator can be kept, as can the power source and power output element. The only change introduced involves the control unit, which can be utilized as described in prior art, but receives a signal source, if necessary an adder, and corresponding control commands in the microprocessor of the control unit, which is present already anyway. These control commands are used to realize the additional capabilities of the adjusting mechanism.

BRIEF DESCRIPTION OF THE DRAWINGS

Additional advantages and features of the invention may be gleaned from the remaining claims, and from the following description of exemplary embodiments, which are not be construed as limiting, and will be explained in greater detail with reference to the drawing. This drawing shows:

DETAILED DESCRIPTION

Figure 1:
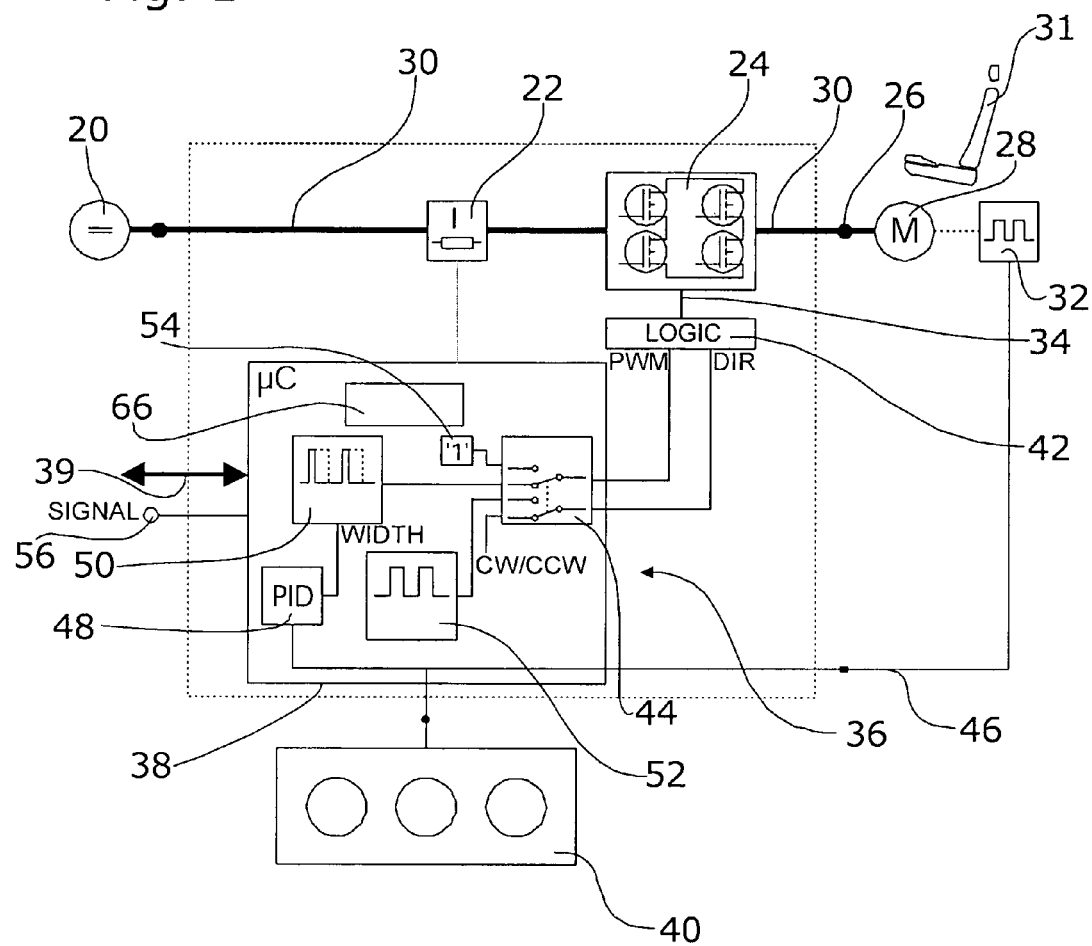
FIG. 1: A diagram of an adjusting mechanism according to a first embodiment of the invention.

A power source 20, here designed as a conventional battery in the electrical wiring of a motor vehicle, is connected by a series resistor 22, also called a shut I, with a power output element 24, here designed as an H-bridge. Such power output elements are sold by STMicroelectronics, Geneva, Switzerland and INT Rectifier Inc., Al Segundo, Calif., for example. The power output element exhibits at least one power transistor; in the case depicted, it has four power transistors designed as FET's. The power output element 24 is in turn connected via plug-in connections 26 of an actuator to an actuator 28, which is shown on the figures as an electric motor and labeled with the letter M. The previously described electrical connections are established by way of a line 30, shown as a thick line in the drawing. For example, it carries a current of about 30 A.

The mechanical parts of the adjusting mechanism are driven by the actuator 28, and shown using an automobile seat 31 as an example, which can be adjusted in terms of length, seat height and back inclination according to prior art. Such mechanical parts of the adjusting mechanism are known in the art, and are not changed by the invention. A rotation sensor 32, e.g., a rotation angle sensor, is mechanically coupled with the output shaft of the actuator 28.

The power output element 24 is connected with the control unit 36 via a control line 34. In the exemplary embodiments, it is realized by a microprocessor 38, which is also marked μC. A control program is stored therein; this control program is called and run as a function of entries made by way of a bus 39 and/or a control panel 40. Other realizations of the control unit 36 are possible.

The power output element 24 exhibits a logic circuit 42 used for directly activating the power output element 24; and two lines, specifically a DIR line for directional control and a PWM line for the modulation signal, with which the microprocessor 38 is connected. The logic circuit 42 is preferably arranged on a chip along with the power output element 24.

The microprocessor 38 incorporates a changeover switch 44 with two individual two-way switches, which makes it possible to optionally switch between the primary function and secondary function, i.e., adjusting function and signaling function. In the switching state specifically depicted, it is in the primary function, or adjusting function. In the exemplary embodiment according to FIG. 1, either the primary function or the secondary function can be executed. The changeover switch 44 is connected with the logic circuit 42 via the described two lines.

The shunt 22 is used to acquire current flowing in the line 30 in a known manner, to which end the shunt 22 is connected with the control unit 36 by means of a connecting line. No separate shunt 22 is provided in this specific case; rather, the saturation resistance of the power semiconductor is used.

The rotation sensor 32 is connected by a sensor line 46 with a PID regulator 48 in the microprocessor, which in turn controls the pulse width of a square-wave generator 50 (PWM) with a modulatable pulse width.

The parts described above comprise an adjusting mechanism according to prior art, with the exception of the changeover switch 44.

The additional parts and functions provided by the invention will now be described in the following.

The microprocessor 38 incorporates a signal generator 52, which can generate at least one signal voltage of varying frequency, waveform, chronological sequence and amplitude. The logic circuit 42 and power output element 24 utilize the latter to generate an alternating voltage, which is applied to plug-in connections 26. This alternating voltage leads to a back-and-forth movement in the actuator 28. This movement is tangible and/or audible to the user, e.g., on the steering wheel and/or car seat. The back-and-forth movement can be a low-frequency motion felt by the user of the motor vehicle as wobbling. It can also be a higher-frequency back-and-forth movement that is less tangible, but audible as a tone. In this case, various frequencies can be emitted simultaneously or superposed, any desired amplitude progressions can be generated, and any desired interval can be provided. The frequency can be chronologically modified as desired.

As shown on FIG. 1, the signal generator 52 is connected with the input DIR of the logic circuit 42 with the changeover switch 44 moved from the depicted position into the other setting. This input is used to switch the voltage sign, and hence determine the direction of the mechanical motion of the actuator 28. The other input of the logic circuit 42, specifically the input PWM, i.e., the input for the modulation signal, is set to a logical 1, see box 54. This tells the logic circuit 42 to always switch at full amplitude. Other control signals can here be used to gradate the amplitude, or modulated, e.g., PMW. This enables silent and loud signals.

The microprocessor 38 also has an input 56, where an externally supplied control voltage supplied can be injected. This control voltage can stem from an external game console, a computer, a radio (none shown) or the like. The actuator 28 can then be moved via the control voltage in sync with the delivered signals, e.g., music.

The microprocessor 38 has a storage device 66 that stores a program for the microprocessor, among other things. It also receives instructions for triggering and generating the signals according to the invention.

Figure 2:
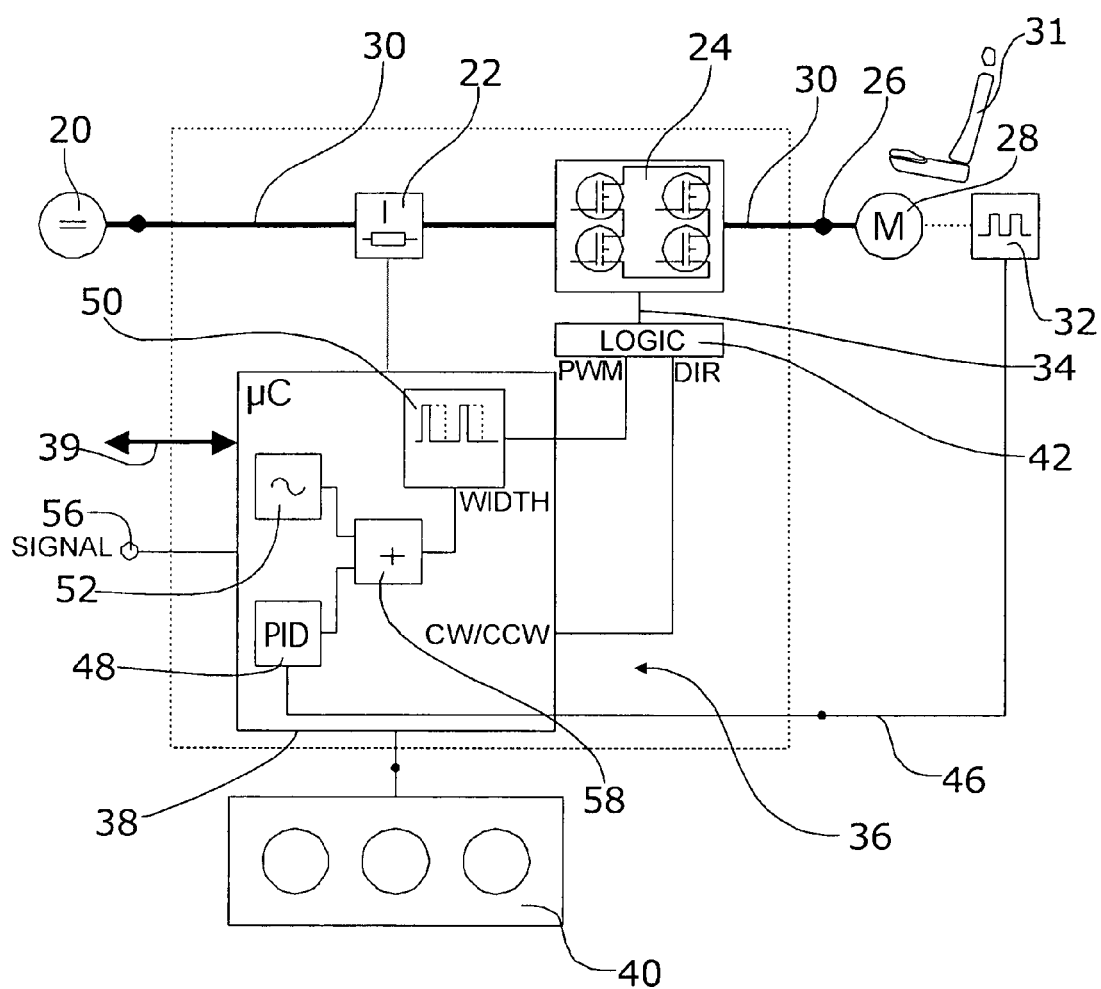
FIG. 2: Same as on FIG. 1, but now for a second embodiment.

In the image on FIG. 2, the parts described to this point have remained unchanged except for the microprocessor 38. The changeover switch 44 has been omitted, and the square-wave generator 50 is connected directly to the input PWM (pulse width modulation) of the logic circuit 42. The output of an adder circuit 58 having two inputs lies at the input of the square-wave generator 50, labeled WIDTH. The one input is allocated to the PID regulator 48. If only the latter were present, wherein its output can also be connected directly to the input of the square-wave generator 50, it would comprise an adjusting mechanism according to prior art. However, the second input of the adder circuit 58 is connected to a signal generator 52, which supplies a sinusoidal voltage in the case shown. This signal generator 52 can be controlled as desired by controllers realized in the microprocessor 38 (not shown), i.e., with respect to frequency (frequencies), amplitude, interval ratio, etc. In particular, it can also be turned off when no signal according to the invention is desired. In like manner, the microprocessor 38 can activate its regulator 48, which only supplies an output signal if an adjustment by the adjusting mechanism is desired or requested, e.g., from the control panel 40 or another input unit (e.g., memory device and via the bus 39). Therefore, a message is only present at least at one of the two inputs of the adder circuit 58 if the microprocessor 38 so initiates and provides. The adder circuit 58 simultaneously allows an adjustment process, permits the release of at least one signal according to the invention when both inputs of the adder circuit 58 are active. However, each input can itself be active and inactive.

Figure 3:
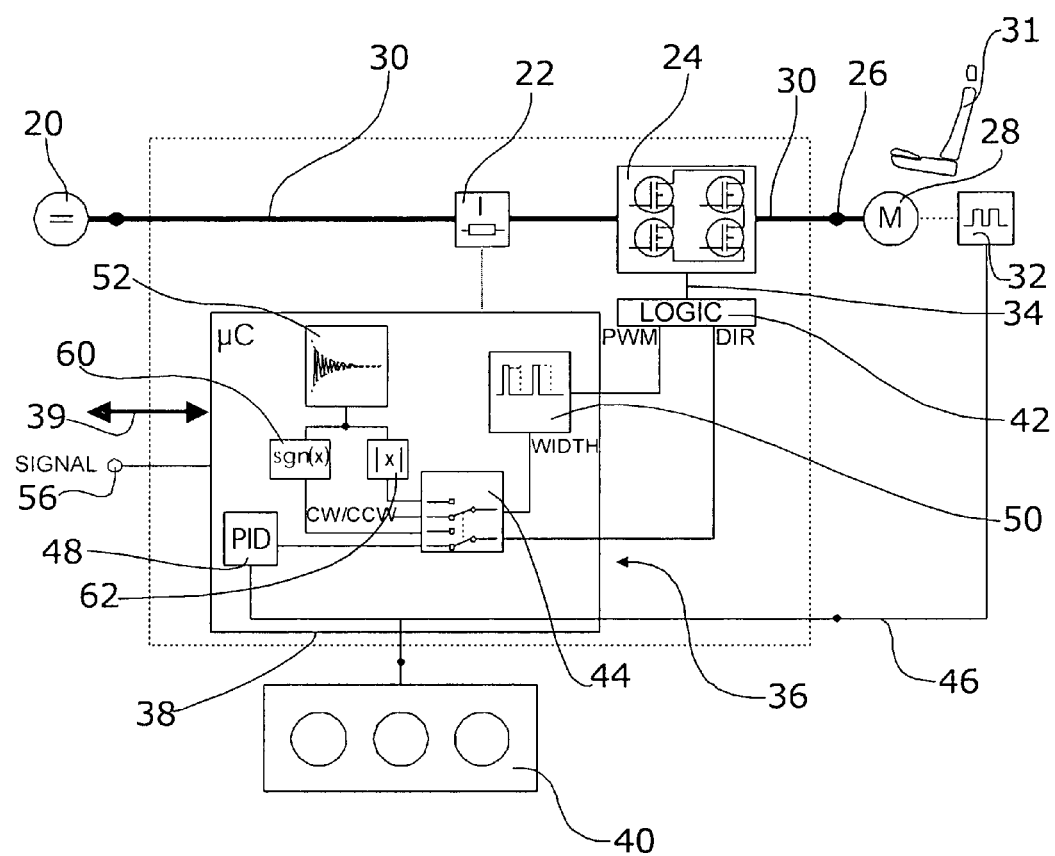
FIG. 3: Same as on FIG. 1, but now for a third embodiment.

Finally, the device according to FIG. 3 makes it possible to generate an audio signal with any audible curve desired, e.g., a type of bell tone with the adjusting drive idle. As provided in the embodiment on FIG. 1, a changeover switch 44 is in turn provided, but now connected directly with the logic circuit 42 with the DIR control line, while the square-wave generator 50 is arranged in the other control line. The switch of the changeover switch 44 responsible for the polarity (the lower one) is connected either to the output of the PID regulator 48 (as shown), or to the output of the signal generator by way of a sign module 60 that computes the sign of the signal voltage of the signal generator 52. The upper switch is connected either to the control signal for forward/backward or left/right motion CW/CCW (as shown), or to the output of the signal generator 52 by way of a control notch 62 for computing the absolute contribution of the voltage delivered by the signal generator 52.

In the switch position shown, only the primary function is active. If the changeover switch is switched, only the secondary function is active.

The adjusting mechanism according to the invention provides at least the following possible applications:

1. Acoustic tuning, so-called sound design, is possible, especially in the audible range. For example, disturbing tones can be masked, e.g., low-frequency portions of the normal operating noise can overlap the higher frequency portions. Targeted use can here be made of human hearing capacity, for example, as occurs in MPEG compression technology as well. Any sounds perceived as disruptive that the adjusting drive itself produces can be packaged with additional acoustic signals as an overall signal, so that a person subjectively perceives the overall signal as being more pleasant than the normal operating sound of the adjusting drive itself. This may differ in certain operating phases, e.g., the advancing path or portions thereof may differ from the retreating path of the adjusting mechanism. In addition, the adjusting sound can be superposed by a song, in particular sounds that denote when a position has been reached, a rising and falling, ascending and descending tone, etc. Specific frequency portions can also be specifically added to achieve a uniform acoustic pattern for all adjustment paths of different adjusting mechanisms. The operating sounds are hence improved and harmonized in this way. The signal can be used to create a feedback loop to provide the user with better information about the current status of the adjusting mechanism. For example, this can also be an overload that is signaled, a blockage of the actuator owing to mechanical objects, such as a piece of luggage, etc. The signal can also be generated shortly before an end stop is reached, e.g., as the "PING" signal.

2. A vibration design is possible, meaning that tangible oscillations can be triggered in a specifically controlled manner. This can be used to generate a vibration alarm during critical driving situations, thereby restoring the tangible contact with the road that is lacking today. However, this also enables an alarm at the very location that the user must immediately react. For example, this does not apply to a simple horn, which is triggered if the driver falls asleep. In such a case, the invention makes it possible for steering wheel to wobble, providing the user with direct feedback. However, haptic feedback is also possible, e.g., by creating a latching sensation as the adjusting mechanism is shifted via the signal, similarly to the high-quality volume controls in HiFi systems.

3. Finally, external control is possible, in that outside signal sources are activated to produce vibrations and tones. In this case, the signal generator is hence provided outside of the microprocessor 38, and consists of a radio, play station, computer, simulator or the like. The input 56 is provided for this purpose.

What is claimed is:

1. A method for operating an adjusting mechanism for a motor vehicle, in particular at least one of an automobile seat and an adjustable steering column comprising:

providing an adjustment mechanism including an electric actuator which comprises plug-in connections;

commencing an adjusting process by applying an electrical adjusting voltage to the plug-in connections;

applying a signal voltage to the plug in connections that consists of alternating voltage either simultaneously or not simultaneously with the adjusting voltage, prompting at least one of (i) a tangible adjusting motion by the actuator, and (ii) an audible adjusting motion by the actuator.

2. The method according to claim 1, wherein an alternating voltage ranging from about 0.1 Hz to about 20 kHz is used as the signal voltage.

3. The method according to claim 1, wherein the electric actuator is an electric motor.

4. The method according to claim 1 further comprising using the adjusting mechanism as a transducing sensor for generating at least one of an audible and tangible signal.

5. The method according to claim 4, wherein the adjusting mechanism is used as a transducing sensor in at least one of a) a critical situation of the motor vehicle, b) during the adjusting process, and c) for changing the sound normally made by the adjusting mechanism during the adjusting process.

6. The method according to claim 5, wherein the critical situation includes at least one of a driver falls asleep, the driver crosses a line, the driver tailgates another car and the driver is too close to an obstacle.

7. The method according to claim 5, wherein the adjusting mechanism is used as a transducing sensor during the adjusting process to provide at least one of a latching sound during the adjustment process, a signal at the end of a motion range, and acoustic information during the adjusting process.

8. The method according to claim 5, wherein changing the sound normally made by the adjusting mechanism during the adjusting process includes adding sound components.

9. The method according to claim 8, wherein the step of adding sound components includes at least one of adding desired frequency ranges and desired amplitudes.

10. An adjusting mechanism for a motor vehicle, in particular an automobile seat or adjustable steering column comprising:

an electric actuator having plug-in-connections;

a control unit including a signal generator; and a power output element arranged between a power source and the plug-in connections, wherein the power output element is controlled by the control unit and applies an electrical adjusting voltage to the plug-in connections during an adjusting process, and that the power output element optionally exposes the plug-in connections to a signal voltage that takes the form of alternating voltage.

11. The adjusting mechanism for a motor vehicle according to claim 5, wherein the plug-in connections are exposed to a signal voltage while an adjusting voltage is being applied to the plug-in connections or while no adjusting voltage is being applied to the plug-in connections.

12. The adjusting mechanism for a motor vehicle according to claim 5, wherein the control unit is a microprocessor.

13. The adjusting mechanism for a motor vehicle according to claim 5, wherein the electric actuator is an electric motor.

* * * * *